(12) United States Patent
Kim (10) Patent No.: US 7,295,276 B2
(45) Date of Patent: Nov. 13, 2007

(54) IN-PLANE SWITCHING MODE LIQUID CRYSTAL DISPLAY DEVICE AND METHOD FOR FABRICATING THE SAME

(75) Inventor: Heung-Soo Kim, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 49 days.

(21) Appl. No.: 10/737,924

(22) Filed: Dec. 18, 2003

(65) Prior Publication Data
US 2004/0125306 A1 Jul. 1, 2004

(30) Foreign Application Priority Data
Dec. 20, 2002 (KR) .................. 10-2002-0081961

(51) Int. Cl.
G02F 1/1345 (2006.01)
G02F 1/1343 (2006.01)

(52) U.S. Cl. .................. 349/152; 349/141; 349/149; 349/151

(58) Field of Classification Search ................ 349/141, 349/149–152
See application file for complete search history.

(56) References Cited

U.S. PATENT DOCUMENTS

| | | | |
|---|---|---|---|
| 6,201,590 B1* | 3/2001 | Ohta et al. | 349/141 |
| 6,266,116 B1* | 7/2001 | Ohta et al. | 349/141 |
| 6,747,722 B2* | 6/2004 | Ono et al. | 349/141 |
| 2002/0036742 A1* | 3/2002 | Kimura et al. | 349/139 |

* cited by examiner

*Primary Examiner*—Michael H. Caley
(74) *Attorney, Agent, or Firm*—McKenna Long & Aldridge LLP (57) ABSTRACT

An in-plane switching mode liquid crystal display device includes: first and second substrates facing and spaced apart from each other; a gate line on of the first substrate; a gate pad formed at one end of the gate line; a common line parallel to and spaced apart from the gate line; a data line crossing the gate line to define a pixel region; a data pad formed at one end of the data line; a terminal line parallel to and spaced apart from the data line, the terminal line being connected to one end of the common line; a thin film transistor connected to the gate line and the data line; a pixel electrode in the pixel region, the pixel electrode being connected to the thin film transistor; a common electrode connected to the common line; a contact terminal connected to the other end of the common line opposite the terminal line, the contact terminal having an island shape; and a liquid crystal layer between the first and second substrates.

20 Claims, 8 Drawing Sheets

IN-PLANE SWITCHING MODE LIQUID CRYSTAL DISPLAY DEVICE AND METHOD FOR FABRICATING THE SAME

This application claims the benefit of Korean Patent Application No. 2002-81961, filed on Dec. 20, 2002, which is hereby incorporated by reference for all purposes as if fully set forth herein.

BACKGROUND OF THE INVENTION

1. Field of the Invention

The present invention relates to liquid crystal display devices. More particularly, the present invention relates to an in-plane switching mode liquid crystal display devices in which bad contacts of common lines are prevented and a fabricating method thereof.

2. Discussion of the Related Art

In general, a liquid crystal display (LCD) device makes use of the optical anisotropy and polarization properties of liquid crystal molecules. The liquid crystal molecules have a definite orientational alignment that results from their thin and long shape. The alignment direction of the liquid crystal molecules can be controlled by application of an electric field to the liquid crystal molecules. Accordingly, as an intensity of the applied electric field changes, the alignment orientation of the liquid crystal molecules also changes. Because incident light through a liquid crystal material is refracted due to an orientation of the liquid crystal molecules resulting from the optical anisotropy of the aligned liquid crystal molecules, an intensity of the incident light can be controlled and images can be displayed.

Among the various types of LCD devices commonly used, active matrix LCD (AM-LCD) devices, in which thin film transistors (TFTs) and pixel electrodes connected to the TFTs are disposed in a matrix, have been developed because of their high resolution and superior display of moving images.

The LCD device includes upper and lower substrates, and a liquid crystal layer interposed therebetween. The upper substrate, which is referred to as a color filter substrate, has a common electrode and the lower substrate, which is referred to as an array substrate, has a pixel electrode. The liquid crystal layer is driven with an electric field generated between the common electrode and the pixel electrode. The LCD device having the common electrode and the pixel electrode on opposite substrates has excellent transmittance and aperture ratio. However, since the electric field is generated perpendicular to the upper and lower substrates, the LCD device has a poor viewing angle property. To solve the problem of narrow viewing angle, new LCD devices such as an in-plane switching (IPS) mode LCD device, where an electric field is laterally generated, may be used.

Figure 1:
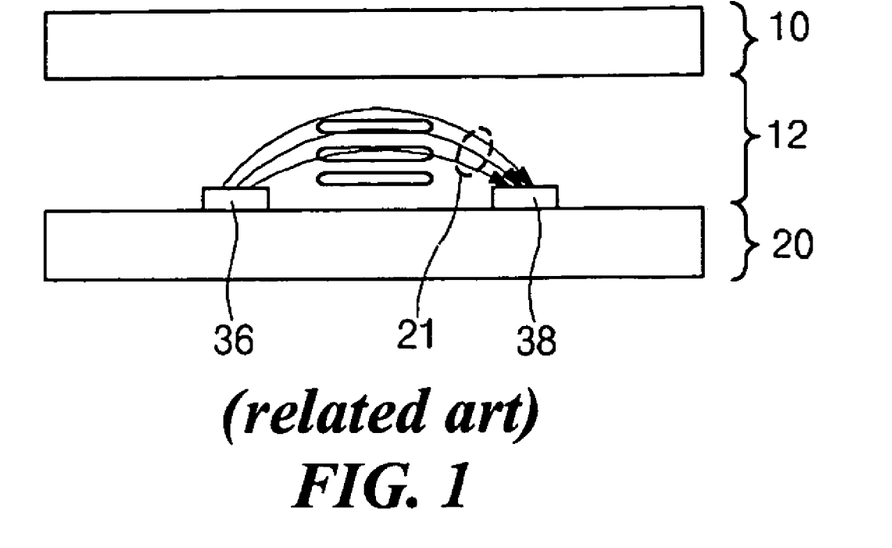
FIG. 1 is a schematic cross-sectional view of an in-plane switching mode liquid crystal display device according to the related art.

FIG. 1 is a schematic cross-sectional view of an in-plane switching mode liquid crystal display device according to the related art.

In FIG. 1, an upper substrate (a color filter substrate) 10 and a lower substrate 20 (an array substrate) face into and are spaced apart from each other. A liquid crystal layer 12 is interposed between the upper and lower substrates 10 and 20. A pixel electrode 36 and a common electrode 38 are formed on an inner surface of the lower substrate 20. The liquid crystal layer 12 is driven with a horizontal electric field generated between the pixel electrode 36 and the common electrode 38.

Figure 2A:
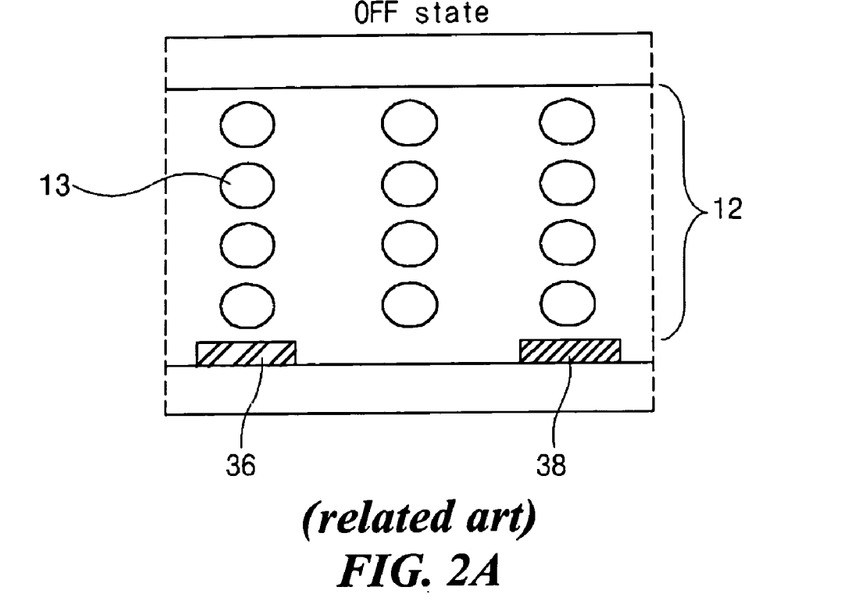
FIGS. 2A and 2B are schematic cross-sectional views showing an OFF state and an ON state of an in-plane switching mode liquid crystal display device according to the related art, respectively.
Figure 2B:
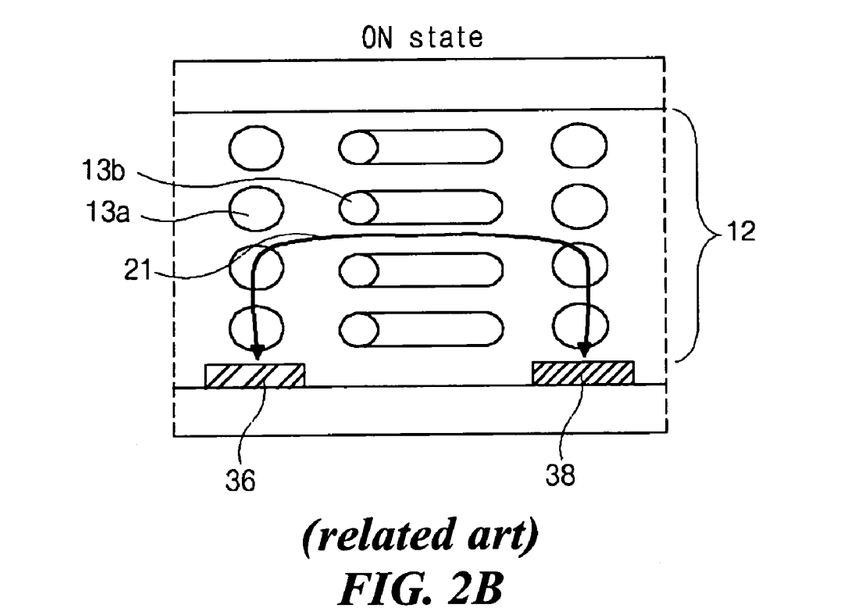

FIGS. 2A and 2B are schematic cross-sectional views showing an OFF state and an ON state of an in-plane switching mode liquid crystal display device according to the related art, respectively.

In FIG. 2A, because a horizontal electric field is not generated in the OFF state, liquid crystal molecules 13 are not re-aligned. Thus, a phase transition of a liquid crystal layer 12 does not occur.

In FIG. 2B, voltages are applied to a pixel electrode 36 and a common electrode 38, thereby an electric field 21 having horizontal and vertical portions is generated. In the vertical portion over the pixel electrode 36 and the common electrode 38, first liquid crystal molecules 13a of the liquid crystal layer 12 are not re-aligned and a phase transition of the liquid crystal layer 12 does not occur. In the horizontal portion between the pixel electrode 36 and the common electrode 38, second liquid crystal molecules 13b of the liquid crystal layer 12 are horizontally re-aligned along the electric field 21 generated by applying voltages to the pixel electrode 36 and the common electrode 38. Thus, a phase transition of the liquid crystal layer 12 occurs in the horizontal portion. Because the liquid crystal molecules are re-aligned along a horizontal electric field, the IPS mode LCD device has a wide viewing angle. For example, users can see images having a respective viewing angle of about 80° to about 85° along top, bottom, right and left direction with respect to a normal direction of the IPS mode LCD device.

Figure 3:
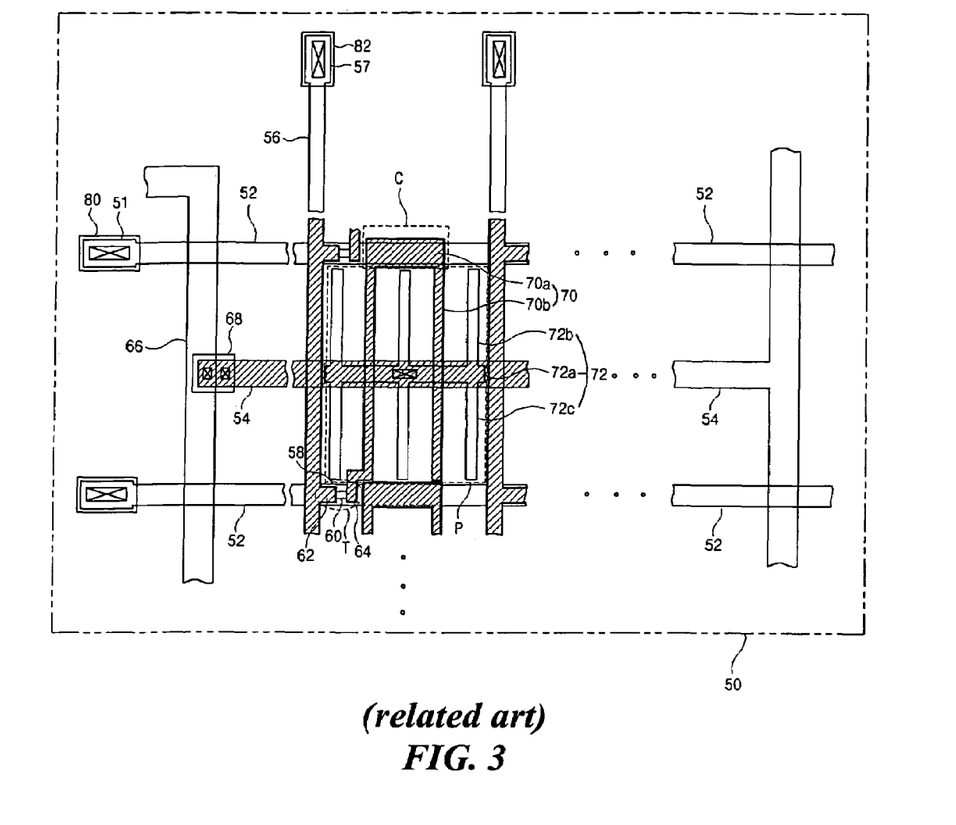
FIG. 3 is a schematic plane view showing an array substrate for an in-plane switching mode liquid crystal display device according to the related art.

FIG. 3 is a schematic plane view showing an array substrate for an in-plane switching mode liquid crystal display device according to the related art.

In FIG. 3, a plurality of gate lines 52, a plurality of common lines 54 and a plurality of data lines 56 are formed on an array substrate 50. A gate pad 51 is formed at one end of each gate line 52. The common line 54 is parallel to and spaced apart from the gate line 52. A data pad 57 is formed at one end of each data line 56. The data line 56 crosses the gate line 52 and the common line 54. A pixel region "P" is defined by the crossing of the gate line 52 and the data line 56. A gate pad terminal 80 and a data pad terminal 82 are formed on the gate pad 51 and the data pad 57, respectively. One end of each common line 54 is connected to a terminal line 66 supplying a common voltage through a connection electrode 68, and the other ends of the plurality of common lines 54 are combined. A thin film transistor (TFT) "T" including a gate electrode 58, an active layer 60 and source and drain electrodes 62 and 64 is formed adjacent the crossing of the gate line 52 and the data line 56. The source electrode 62 is connected to the data line 56 and the gate electrode 58 is connected to the gate line 52.

A pixel electrode 70 connected to the drain electrode 64 is formed in the pixel region "P." A common electrode 72 parallel to the pixel electrode 70 and connected to the common line 56 is also formed in the pixel region "P." The pixel electrode 70 includes a first pixel portion 70a over the gate line 52 and a second pixel portion 70b extending from the first pixel portion 70a to the pixel region "P." The second pixel portion 70b is connected to the drain electrode 64. The common electrode 72 includes a first common portion 72a over the common line 54, and second and third common portions 72b and 72c extending from the first common portion 72a. The first common portion 72a is connected to the common line 54. The second common portion 72b is formed in an upper half of the pixel region "P" and the third common portion 72c is formed in a lower half of the pixel region "P." The common electrode 72 is made of a transparent metallic material and the pixel electrode 70 is made of the same material as the source and drain electrodes 62 and 64. A storage capacitor "C" uses a portion of the gate line 52 as a first capacitor electrode and the first pixel portion 70a as a second capacitor electrode.

A common voltage is applied to the common electrode 72 through the common line 54. To apply a constant common voltage to the entire substrate 50 continuously, one end of each common line 56 is connected to the terminal line 66 and the other end of the plurality of common lines 56 are combined. Because the common line 56 is covered with an insulating layer, a resistance-measuring method can not be used even when a bad contact occurs between the common line 54 and the terminal line 66. Accordingly, defects such as a bad contact are detected through an electric inspection after the fabricating process of the array substrate is completed. Because the array substrate having defects can not be used for the LCD device, production yield is reduced and fabricating cost increases.

SUMMARY OF THE INVENTION

Accordingly, the present invention is directed to an in-plane switching mode liquid crystal display device that substantially obviates one or more of the problems due to limitations and disadvantages of the related art.

An advantage of the present invention is to provide an array substrate for an in-plane switching mode liquid crystal display device including a contact terminal on a common line opposite to a terminal line.

Another advantage of the present invention is to detect defects of a common line by measuring line resistance through a contact terminal.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes: first and second substrates facing and spaced apart from each other; a gate line on the first substrate; a gate pad formed at one end of the gate line; a common line parallel to and spaced apart from the gate line; a data line crossing the gate line to define a pixel region; a data pad formed at one end of the data line; a terminal line parallel to and spaced apart from the data line, the terminal line being connected to one end of the common line; a thin film transistor connected to the gate line and the data line; a pixel electrode in the pixel region, the pixel electrode being connected to the thin film transistor; a common electrode connected to the common line; a contact terminal connected to the other end of the common line opposite the terminal line, the contact terminal having an island shape; and a liquid crystal layer between the first and second substrates.

In another aspect of the present invention, a fabricating method of an in-plane switching mode liquid crystal display device includes: forming a gate line and a gate pad on a first substrate, the gate pad being formed at one end of the gate line; forming a common line parallel to and spaced apart from the gate line; forming a data line crossing the gate line to define a pixel region and a data pad at one end of the data line; forming a terminal line parallel to and spaced apart from the data line, the terminal line being connected to one end of the common line; forming a thin film transistor connected to the gate line and the data line; forming a pixel electrode in the pixel region, the pixel electrode being connected to the thin film transistor; forming a common electrode connected to the common line; forming a contact terminal connected to the other end of the common line opposite the terminal line, the contact terminal having an island shape; attaching the first substrate and a second substrate; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or like parts.

Figure 4:
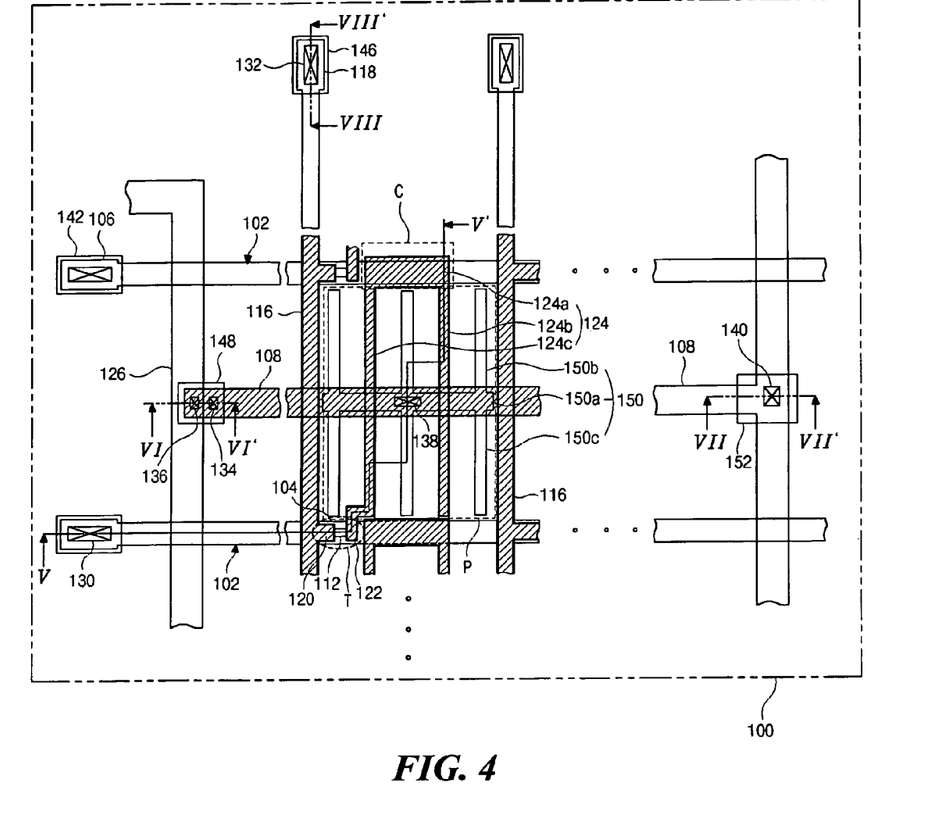
FIG. 4 is a schematic plane view showing an array substrate for an in-plane switching mode liquid crystal display device according to an embodiment of the present invention.

FIG. 4 is a schematic plane view showing an array substrate for an in-plane switching mode liquid crystal display device according to an embodiment of the present invention.

In FIG. 4, a plurality of gate lines 102, a plurality of common lines 108 and a plurality of data lines 116 are formed on an array substrate 100. A gate pad 106 is formed at one end of each gate line 102. The common line 108 is parallel to and spaced apart from the gate line 102. A data pad 118 is formed at one end of each data line 116. The data line 116 crosses the gate line 102 and the common line 106. A pixel region "P" is defined by a crossing of the gate line 102 and the data line 116. A gate pad terminal 142 and a data pad terminal 146 are formed on the gate pad 106 and the data pad 118, respectively. One end of each common line 108 is connected to a terminal line 126 supplying a common voltage through a connection electrode 148, and the other ends of the plurality of common lines 108 are combined. A contact terminal 152 is formed on the other end of each common line 108. A thin film transistor (TFT) "T" including a gate electrode 104, an active layer 112 and source and drain electrodes 120 and 122 is formed adjacent the crossing of the gate line 102 and the data line 116. The source electrode 120 is connected to the data line 116 and the gate electrode 104 is connected to the gate line 102.

A pixel electrode 124 connected to the drain electrode 122 is formed in the pixel region "P." A common electrode 150 parallel to the pixel electrode 124 and connected to the common line 108 is also formed in the pixel region "P." The pixel electrode 124 includes a first pixel portion 124a over the gate line 102, and second and third pixel portions 124b and 124c extending from ends of the first pixel portion 124a to the pixel region "P." The third pixel portion 124c is connected to the drain electrode 122. The common electrode 150 includes a first common portion 150a over the common line 108, and second and third common portions 150b and 150c extending from the first common portion 150a. The first common portion 150a is connected to the common line 108. The second common portion 150b is formed in an upper half of the pixel region "P" and the third common portion 150c is formed in a lower half of the pixel region "P." The common electrode 150 is made of a transparent metallic material and the pixel electrode 124 is made of the same material as the source and drain electrodes 120 and 122. A storage capacitor "C" uses a portion of the gate line 102 as a first capacitor electrode and the first pixel portion 124a as a second capacitor electrode.

The other ends of the plurality of common lines 108 over which the contact terminal 152 is formed may be cut by a specific method during a subsequent process and may be separated.

Figure 5A:
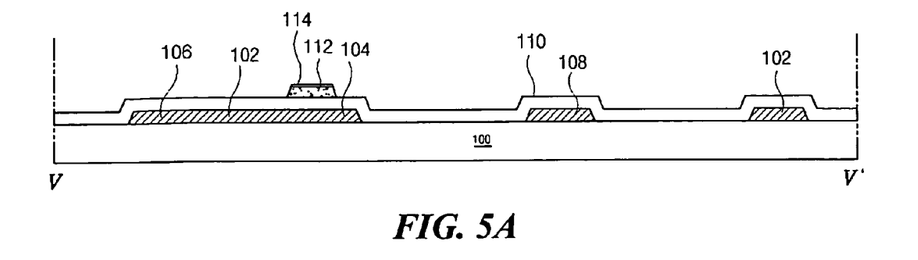
FIGS. 5A to 5C are schematic cross-sectional views, which are taken along a line V-V' of FIG. 4, showing a fabricating process of a gate pad and a thin film transistor of an array substrate for an in-plane switching mode liquid crystal display device according to an embodiment of the present invention.
Figure 5B:
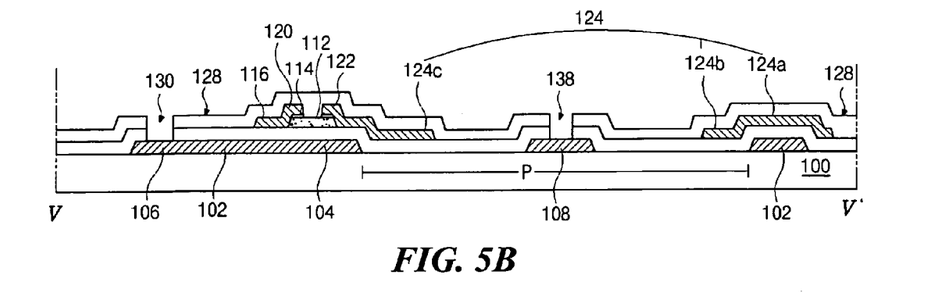
Figure 5C:
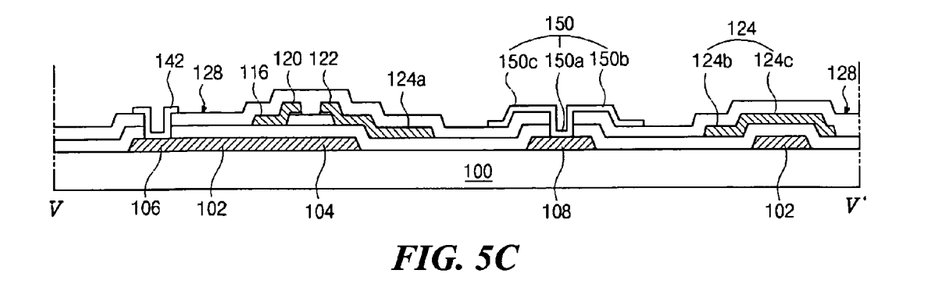
Figure 6A:
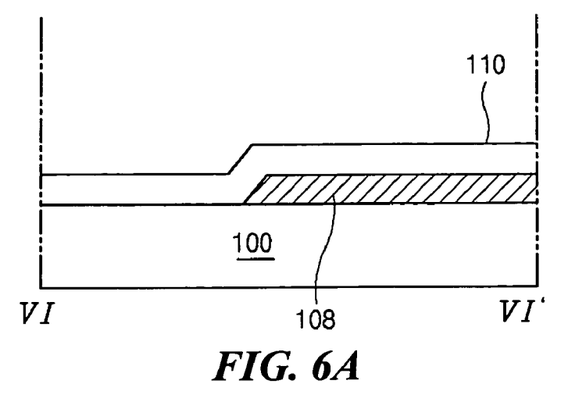
FIGS. 6A to 6C are schematic cross-sectional views, which are taken along a line VI-VI' of FIG. 4, showing a fabricating process of a terminal line and one end of a common line of an array substrate for an in-plane switching mode liquid crystal display device according to an embodiment of the present invention.
Figure 6B:
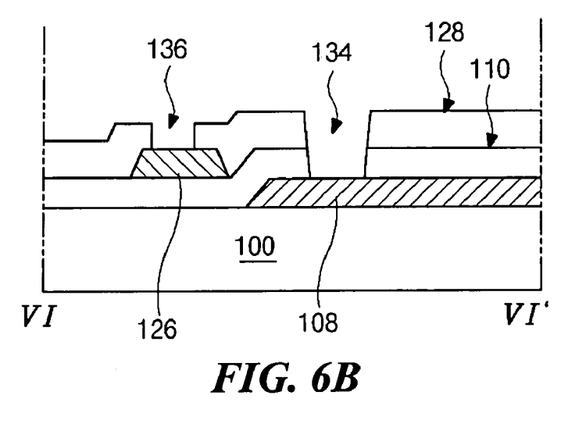
Figure 6C:
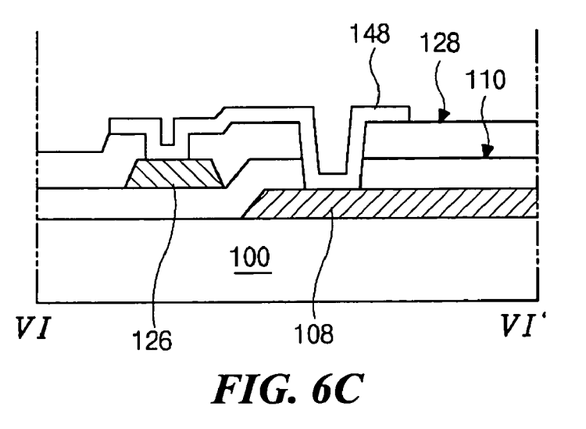
Figure 7A:
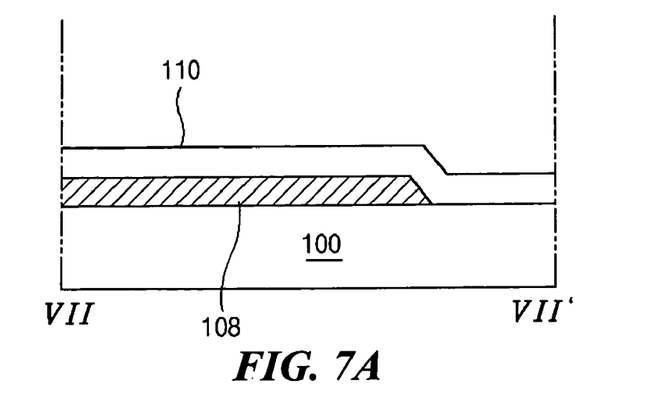
FIGS. 7A to 7C are schematic cross-sectional views, which are taken along a line VII-VII' of FIG. 4, showing a fabricating process of the other end of a common line of an array substrate for an in-plane switching mode liquid crystal display device according to an embodiment of the present invention.
Figure 7B:
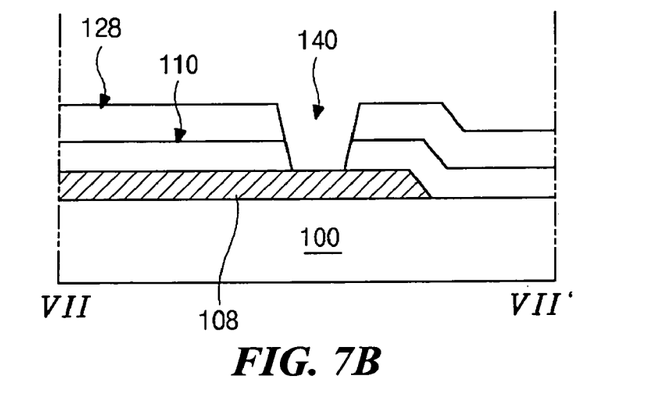
Figure 7C:
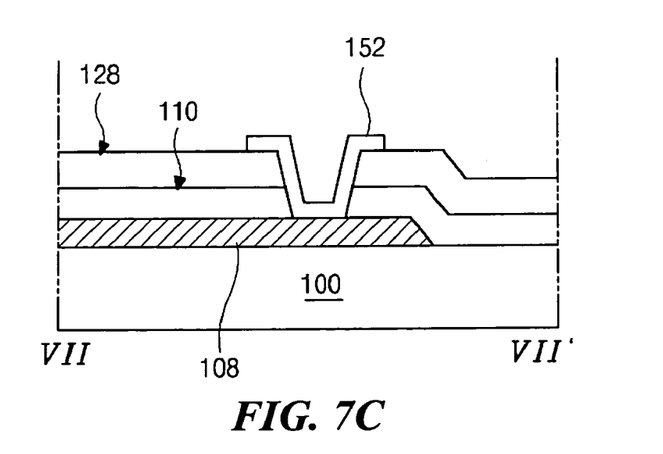
Figure 8A:
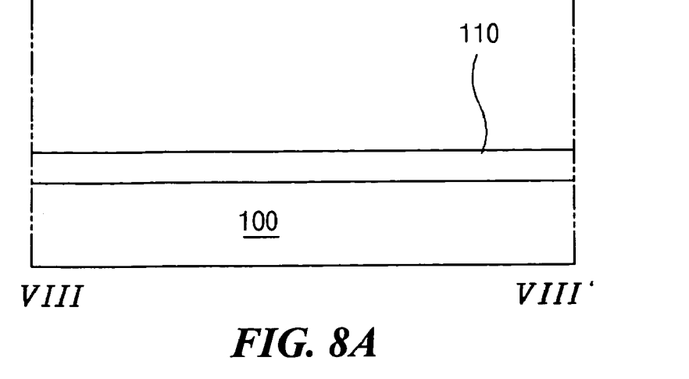
FIGS. 8A to 8C are schematic cross-sectional views, which are taken along a line VIII-VIII' of FIG. 4, showing a fabricating process of a data pad of an array substrate for an in-plane switching mode liquid crystal display device according to an embodiment of the present invention.
Figure 8B:
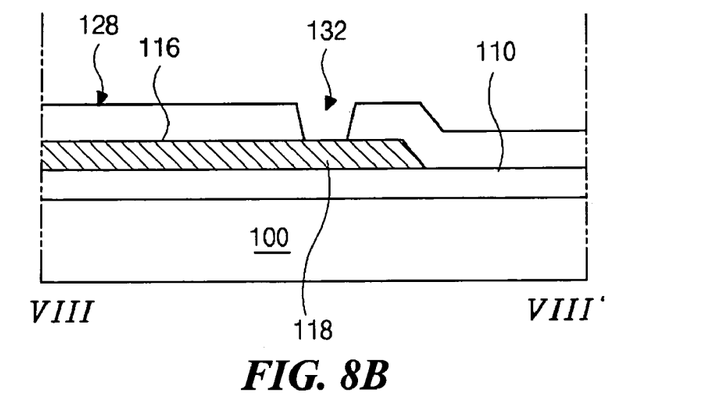
Figure 8C:
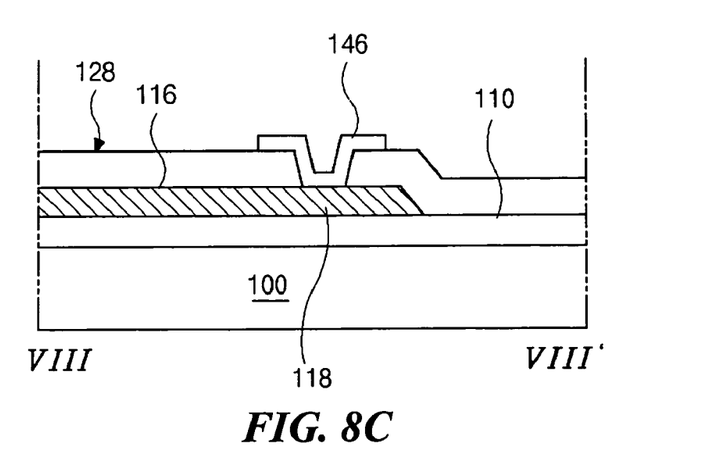

FIGS. 5A to 5C are schematic cross-sectional views, which are taken along a line V-V' of FIG. 4, showing a fabricating process of a gate pad and a thin film transistor of an array substrate for an in-plane switching mode liquid crystal display device according to an embodiment of the present invention. FIGS. 6A to 6C are schematic cross-sectional views, which are taken along a line VI-VI' of FIG. 4, showing a fabricating process of a terminal line and one end of a common line of an array substrate for an in-plane switching mode liquid crystal display device according to an embodiment of the present invention. FIGS. 7A to 7C are schematic cross-sectional views, which are taken along a line VII-VII' of FIG. 4, showing a fabricating process of the other end of a common line of an array substrate for an in-plane switching mode liquid crystal display device according to an embodiment of the present invention. FIGS. 8A to 8C are schematic cross-sectional views, which are taken along a line VIII-VIII' of FIG. 4, showing a fabricating process of a data pad of an array substrate for an in-plane switching mode liquid crystal display device according to an embodiment of the present invention.

In FIGS. 5A, 6A, 7A and 8A, a gate line 102, a gate pad 106 and a gate electrode 104 are formed on a substrate 100 through depositing and patterning one of a conductive metal group including aluminum (Al), aluminum alloy such as aluminum neodymium (AlNd), chromium (Cr), molybdenum (Mo) and tungsten (W). The gate pad 106 is formed at one end of the gate line 102 and the gate electrode 104 is connected to the gate line 102. At the same time, a common line 108 parallel to and spaced apart from the gate line 102 is formed on the substrate 100. Even though not shown in cross-sectional views, a plurality of common lines 108 may be combined. A gate insulating layer (a first insulating layer) 110 is formed on the gate line 102 and the common line 108 through depositing one of an inorganic insulating material group including silicon nitride ($SiN_x$) and silicon oxide ($SiO_2$). An active layer 112 and an ohmic contact layer 114 are formed on the gate insulating layer 110 over the gate electrode 104 through depositing and patterning intrinsic amorphous silicon (a-Si:H) and impurity-doped amorphous silicon (n+a-Si:H).

In FIGS. 5B, 6B, 7B and 8B, a data line 116, a data pad 118, and source and drain electrodes 120 and 122 are formed on the gate insulating layer 110 and the ohmic contact layer 114 through depositing and patterning one of a conductive metal group including aluminum (Al), aluminum alloy such as aluminum neodymium (AlNd), chromium (Cr), molybdenum (Mo) and tungsten (W). The data line 116 crosses the gate line 102 and the common line 108 and a pixel region "P" is defined by a the crossing of the data line 116 and the gate line 102. The data pad 118 is formed at one end of the data line 116. The source electrode 120 is connected to the data line 116. The source and drain electrodes 120 and 122 are spaced apart from each other and overlap the ohmic contact layer 114. At the same time, a pixel electrode 124 including first to third pixel portions 124a to 124c and a terminal line 126 are formed on the gate insulating layer 110. The first pixel portion 124a is formed over the gate line 102. The second and third pixel portions 124b and 124c are parallel to and spaced apart from each other and extend from the first pixel portion 124a to the pixel region "P." The terminal line 126 is parallel to the data line 116.

A passivation layer (a second insulating layer) 128 is formed on the source and drain electrodes 120 and 122, the data line 116, the data pad 118, the pixel electrode 124 and the terminal line 126 through depositing one of an inorganic insulating material group including silicon nitride ($SiN_x$) and silicon oxide ($SiO_2$) and an organic insulating material group including benzocyclobutene (BCB) and acrylic resin. A gate pad contact hole 130 exposing the gate pad 106, a data pad contact hole 132 exposing the data pad 118, a terminal line contact hole 136 exposing the terminal line 126, a first connection contact hole 134 exposing one end of the common line 108 adjacent to the terminal line 126, a second common line contact hole 138 exposing the common line 108 in the pixel region "P" and a third common line contact hole 140 exposing the other end of the common line 108 opposite to the terminal line 126 are formed through patterning the gate insulating layer 110 and the passivation layer 128.

In FIGS. 5C, 6C, 7C and 8C, a gate pad terminal 142 contacting the gate pad 106, a data pad terminal 146 contacting the data pad 118 and a connection electrode 148 connecting the common line 108 and the terminal line 126 are formed on the passivation layer 128 through depositing and patterning one of a transparent conductive material such as indium-tin-oxide (ITO) and indium-zinc-oxide (IZO). At the same time, a common electrode 150 including a first common portion 150a over the common line 108, and second and third common portions 150b and 150c extending from the first common portion 150a toward opposite directions. The first common portion 150a is connected to the common line 108 through the second common line contact hole 138. In addition, a contact terminal 152 of an island shape is simultaneously formed on the passivation layer 128. The contact terminal 152 is connected to the common line 108 through the third common line contact hole 140.

In an IPS mode LCD device according to an embodiment of the present invention, one end of the common lines 108 are connected to each other through the terminal line 126 and the other end of the common lines 108 are combined by a contact terminal 152. Because the ends of the common lines 108 over which the contact terminal 152 is formed are cut by a specific method during a subsequent process, the common lines 108 can be separated. Accordingly, contact resistance of the individual common line 108 can be measured through the contact terminal 152. As a result, a common line having a bad contact property can be detected before the fabricating process of the array substrate is completed and the common line can be repaired. Therefore, production yield is improved and fabricating cost is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    first and second substrates facing and spaced apart from each other;
    a gate line on the first substrate;
    a gate pad formed at one end of the gate line;
    a common line parallel to and spaced apart from the gate line;
    a data line crossing the gate line to define a pixel region;
    a data pad formed at one end of the data line;
    a terminal line parallel to and spaced apart from the data line, the terminal line being connected to one end of the common line;
    a thin film transistor connected to the gate line and the data line;
    a pixel electrode in the pixel region, the pixel electrode being connected to the thin film transistor;
    a common electrode connected to the common line;
    a contact terminal connected to the other end of the common line opposite the terminal line and spaced apart from an adjacent contact terminal, the contact terminal having an island shape, the contact terminal formed above a passivation layer, said passivation layer formed on the data line;
    a liquid crystal layer between the first and second substrates; and
    a connection electrode contacting the terminal line and the common line.

2. The device according to claim 1, wherein the thin film transistor includes a gate electrode, an active layer, and source and drain electrodes, wherein the pixel electrode contacts the drain electrode.

3. The device according to claim 1, wherein the common electrode includes a first common portion over the common line, and second and third common portions extending from the first common portion, wherein the first common portion contacts the common line, the second common portion is formed in a first half of the pixel region, and the third common portion is formed in a second half of the pixel region.

4. The device according to claim 1, wherein the pixel electrode includes a first pixel portion over the gate line, and second and third pixel portions extending from the first pixel portion.

5. The device according to claim 4, wherein the gate line and the first pixel portion form a storage capacitor.

6. The device according to claim 1, wherein the common electrode includes one of indium-tin-oxide (ITO) and indium-zinc-oxide (IZO).

7. The device according to claim 1, wherein the gate line has the same material and is on the same layer as the common line.

8. The device according to claim 1, wherein the terminal line has the same material and is on the same layer as the data line.

9. The device according to claim 1, further comprising: a gate pad terminal contacting the gate pad and a data pad terminal contacting the data pad.

10. The device according to claim 1, wherein the contact terminal is on the same layer as the common electrode.

11. A fabricating method of an in-plane switching mode liquid crystal display device, comprising:
    forming a gate line and a gate pad on a first substrate, the gate pad formed at one end of the gate line;
    forming a common line parallel to and spaced apart from the gate line;
    forming a data line crossing the gate line to define a pixel region and a data pad at one end of the data line;
    forming a passivation layer above the common line and on the data line;
    forming a terminal line parallel to and spaced apart from the data line, the terminal line connected to one end of the common line;
    forming a thin film transistor connected to the gate line and the data line;
    forming a pixel electrode in the pixel region, the pixel electrode connected to the thin film transistor;
    forming a common electrode connected to the common line;
    forming a contact terminal above the passivation layer and connected to the other end of the common line opposite the terminal line and spaced apart from an adjacent contact terminal, the contact terminal having an island shape;
    attaching the first substrate and a second substrate; and
    forming a liquid crystal layer between the first and second substrates and forming a connection electrode contacting the terminal line and the common line.

12. The method according to claim 11, wherein the thin film transistor includes a gate electrode, an active layer, and source and drain electrodes, wherein the pixel electrode contacts the drain electrode.

13. The method according to claim 11, wherein the common electrode includes a first common portion over the common line, and second and third common portions extending from the first common portion, wherein the first common portion contacts the common line, the second common portion is formed in a first half of the pixel region, and the third common portion is formed in a second half of the pixel region.

14. The method according to claim 11, wherein the pixel electrode includes a first pixel portion over the gate line, and second and third pixel portions extending from the first pixel portion.

15. The method according to claim 14, wherein the gate line and the first pixel portion form a storage capacitor.

16. The method according to claim 11, wherein the common electrode includes one of indium-tin-oxide (ITO) and indium-zinc-oxide (IZO).

17. The method according to claim 11, wherein the gate line and the common line are formed simultaneously.

18. The method according to claim 11, wherein the terminal line and the data line are formed simultaneously.

19. The method according to claim 11, further comprising:
   forming a gate pad terminal contacting the gate pad and forming a data pad terminal contacting the data pad.

20. The method according to claim 11, wherein the contact terminal and the common electrode are formed simultaneously.

* * * * *